(12) United States Patent  
Sato et al.

(10) Patent No.: US 6,735,152 B2
(45) Date of Patent: May 11, 2004

(54) INFORMATION PLAYBACK APPARATUS FOR PLAYING BACK DATA RECORDED IN AN INFORMATION RECORDING MEDIUM

(75) Inventors: Hitoshi Sato, Saitama-ken (JP); Yukari Mizumura, Saitama-ken (JP); Takamasa Yamaguchi, Saitama-ken (JP); Toshiyuki Murata, Saitama-ken (JP); Rie Yamashita, Saitama-ken (JP); Hidetsugu Kubota, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/235,729

(22) Filed: Sep. 6, 2002

(65) Prior Publication Data

US 2003/0053380 A1 Mar. 20, 2003

(30) Foreign Application Priority Data

Sep. 17, 2001 (JP) .......................................... 2001-281629

(51) Int. Cl.⁷ ................................................. G11B 7/00
(52) U.S. Cl. ................................................... 369/30.08
(58) Field of Search ........................... 369/30.08, 30.09, 369/30.1

(56) References Cited

U.S. PATENT DOCUMENTS 5,126,987 A  *  6/1992  Shiba et al. ................... 369/32
5,457,669 A     10/1995  Kim et al. ..................... 369/32

FOREIGN PATENT DOCUMENTS

EP           0 795 869 A2    9/1997

* cited by examiner

*Primary Examiner*—Nabil Hindi
(74) *Attorney, Agent, or Firm*—Arent Fox PLLC

(57) ABSTRACT

An information playback apparatus which can perform scan playback capable of being performed with finer settings. When a unit cycle B and a playback time A within the unit cycle B are specified and the start of the scan playback of playback data recorded in a DVD is specified, playback control data having address information and information of the playback order appended to each piece of data in the smallest basic units of the playback data is read out from the DVD, whereby the scan playback of the playback data is performed by managing the playback time A in every unit cycle B. Also, when access-inhibited data is present within the playback data, the scan playback of playback data is performed except the access-inhibited data.

3 Claims, 11 Drawing Sheets

INFORMATION PLAYBACK APPARATUS FOR PLAYING BACK DATA RECORDED IN AN INFORMATION RECORDING MEDIUM

BACKGROUND OF THE INVENTION

The present invention relates to an information playback apparatus for reading out and playing back information recorded in an information recording medium, such as a DVD (Digital Versatile Disc), a CD (Compact Disc), and an MD (Mini Disc).

The present application claims priority from Japanese Application No.2001-281629, the disclosure of which is incorporated herein by reference for all purposes.

Recently, attention is being given to a DVD as an example of a large-capacity information recording medium capable of recording contents, such as long-playing movies and music. Also, an information playback apparatus for reading out and playing back information from the DVD is furnished with multiple functions to enhance the convenience of the user or the like, and for example, there is known a type furnished with a function called "scan playback."

When the user or the like selects the scan playback, the information playback apparatus starts partial playback of the contents (referred to as titles in the case of a DVD), such as a movie recorded in the DVD, by jumping from one portion to another instead of performing continuous playback.

Hence, when the user or the like selects the scan playback, as schematically shown in a block (a) of FIG. 11, data in some portions of a movie or the like is skipped, and as shown in a block (b) of FIG. 11, partial playback is performed by playing back only the data in the remaining portions by jumping from one portion to another, which offers an advantage that the user or the like can have an overview of the movie or the like in a short time.

Incidentally, according the conventional scan playback, when a DVD is played, for example, skipping and partial playback are performed on the basis of a chapter unit or a track unit preset by a producer of the DVD or the like. In other words, because titles, such as a movie, are made up of a set of one or more chapters or tracks, a time length of the skip portions and a time length of partial playback portions are determined in such a manner that they are always natural number times the length of the chapter unit or the track unit.

Hence, there are problems that it is impossible to perform skipping and partial playback in units divided into a shorter time than the chapter unit or the track unit, and further, it is impossible to perform skipping and partial playback for a time length other than natural number times the length of the chapter unit or the tack unit.

To be more concrete, there is a problem as follows. That is, when the pre-set chapter unit or track unit is long, so are the respective skip portions illustrated in the block (a) of FIG. 11 by way of example. Hence, when the scan playback is performed as shown in the block (b) of FIG. 11, since the skip portions are too long, much of the story is missing between the respective playback portions #1 though #n, which poses a problem that the user or the like cannot readily follow the plot from the videos derived from the scan playback.

Also, as illustrated in a block (c) of FIG. 11 by way of example, when all the titles, such as a movie, are recorded in a single chapter, there is a problem that the user or the like cannot practically use the conventional scan playback. In such a case, when the scan playback is performed, no skipping is performed as shown in a block (d) of FIG. 11, and a movie or the like is played from beginning to end as a playback portion. As a result, there is a problem that the substantial advantage of the scan playback cannot be attained.

SUMMARY OF THE INVENTION

The present invention has been devised to solve the above conventional problems, and therefore, has an object to provide a more convenient information playback apparatus capable of, for example, setting finer playback portion and skip portion than a chapter unit or a track unit.

In order to achieve the above and other objects, an information playback apparatus of the present invention is an information playback apparatus for playing back playback data recorded in an information recording medium as a set of data in predetermined smallest basic units, including: playback device for playing back playback control data including address information and information of a playback order of all the data in the smallest basic units and recorded in the information recording medium to perform playback control of the playback data, and for playing back the playback data according to the playback control data; and control device for, upon being specified by a playback time for every unit cycle, setting the playback time for every unit cycle as desired playback times to perform playback of the playback data and managing the desired playback times according to the address information, and for controlling the playback device to playback, of all the data in the smallest basic units, only the data corresponding to the desired playback times.

According to the information playback apparatus of the present invention arranged as above, when the user or the like specifies the playback time for every unit cycle, the playback data is divided into unit cycles, and a playback time within each divided unit cycle is set as a desired playback time. Then, of all the playback data, only the data corresponding to the desired playback times is played back based on the playback control data, whereby scan playback can be performed. When scan playback is performed for the playback data made up as a set of data in the smallest basic units, divided times by a unit time and the desired playback times are managed based on the address information of all the data in the smallest basic units, and only the data within the desired playback times is played back seamlessly. In this manner, by performing playback deeming the data in the smallest basic units (which are the basal elements of the playback data) as the subjects of playback, it is possible to realize accurate scan playback. Moreover, it is possible to set non-playback portions and playback portions of so-called titles accurately and freely.

Also, with the information playback apparatus of the present invention, after the data in the smallest basic units corresponding to one of the desired playback times is played back, and when access-inhibited data is present at a start position of a next desired playback time, the control device controls the playback device to continue to perform playback except said access-inhibited data.

According to the above arrangement, in a case where the access-inhibited data is contained in the playback data, after the data in the smallest basic units corresponding to one of the desired playback times defined by the unit cycles is played back and when scan playback is being performed and the access-inhibited data is present at the start position of a next desired playback time, playback is performed by omitting the access-inhibited data from the objects of playback.

Consequently, for example, even when the access-inhibited data is set by an edit function of the information recording medium or the like, it is still possible to realize scan playback which does not go against the standard of information recording media by omitting the access-inhibited data from the objects of scan playback.

In addition, with the information playback apparatus of the present invention, when the access-inhibited data is present at the start position of the next desired playback time, the control device controls the playback device to omit the next desired playback time and then to continue to perform playback from a further next desired playback time.

According to the above arrangement, when the access-inhibited data is omitted, the unit cycle itself which contains the access-inhibited data is omitted, so that playback is continued from the next unit cycle, thereby realizing scan playback which does not go against the standard of the information recording media.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
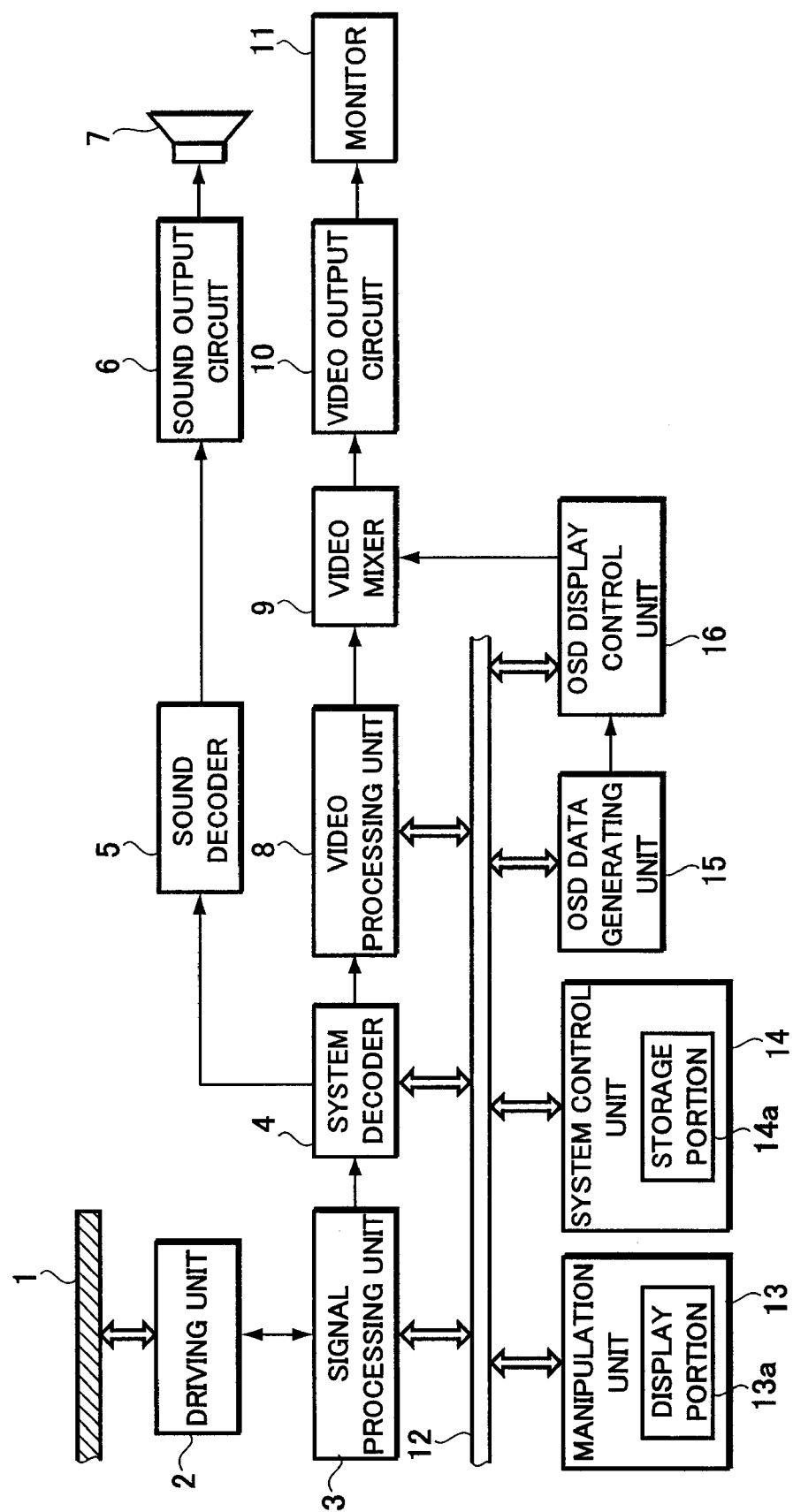
FIG. 1 is a block diagram showing an arrangement of an information playback apparatus according to one embodiment of the present invention.
Figure 2:
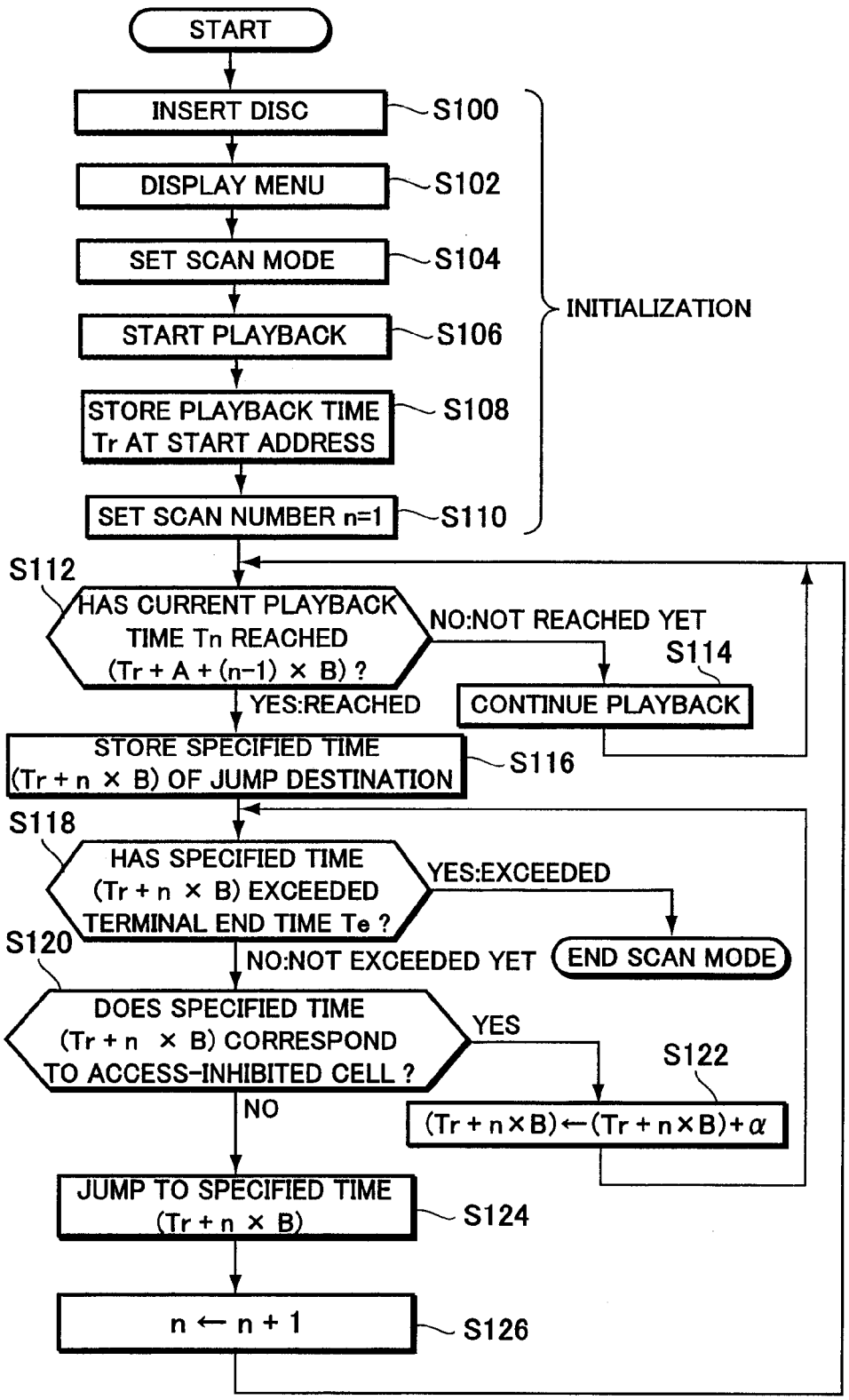
FIG. 2 is a flowchart detailing an operation example of scan playback by the information playback apparatus.
Figure 3:
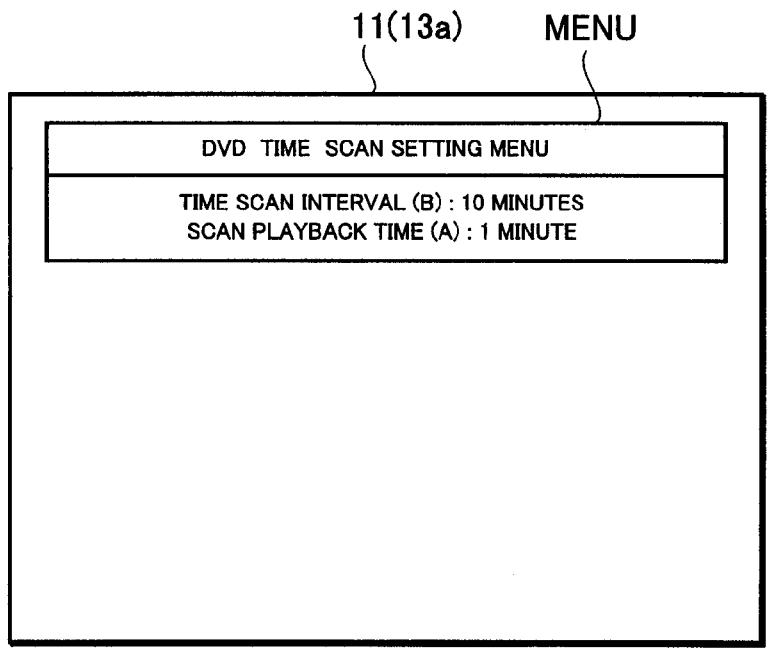
FIGS. 3(a) and 3(b) are views showing concrete examples of menu display at the time of scan playback.
Figure 3:
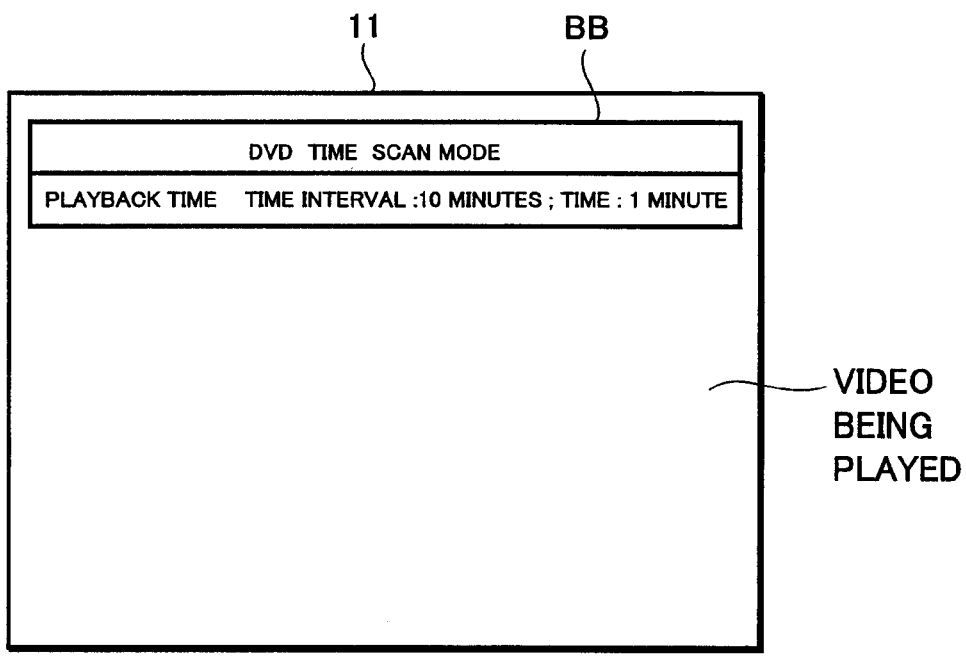

The following description will describe an information playback apparatus for playing a DVD as a preferred embodiment of the present invention. FIG. 1 is a block diagram showing an arrangement of the information playback apparatus of the present embodiment, and FIG. 2 is a flowchart detailing an operation of the information playback apparatus. FIGS. 3(a) through 6 are views explaining an operation of the information playback apparatus, and FIGS. 7 through 10 are views showing a data structure of a DVD in conformity with the DVD standard.

Firstly, prior to an explanation of the arrangement of the information playback apparatus, the data structure of the DVD will be briefly explained with reference to FIGS. 7 through 10.

Figure 7:
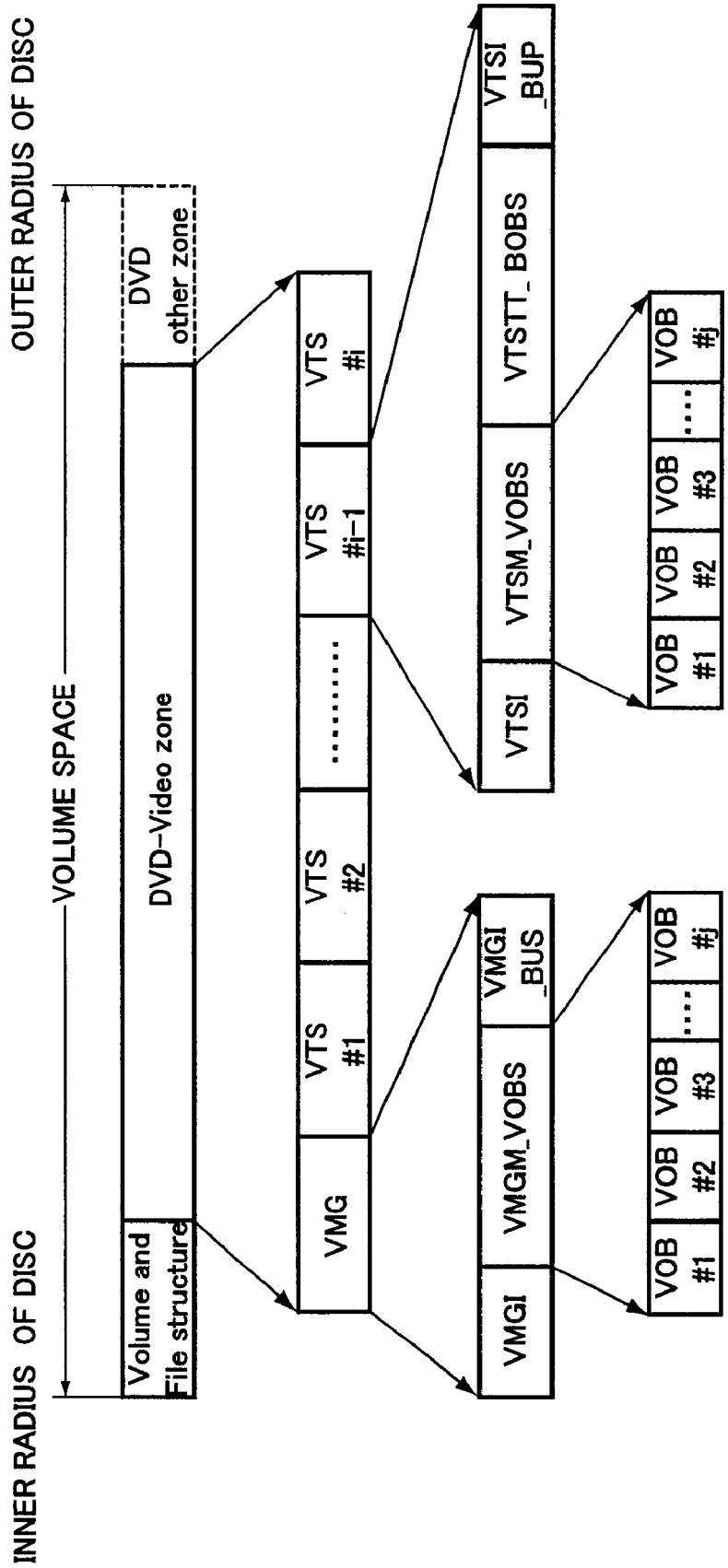
FIG. 7 is a view showing the volume space of a DVD, as well as the data structure of a video manager (VMG) and a video title set (VTS) of the DVD.

Referring to FIG. 7, the DVD is provided with a volume space as a data recording area, and the volume space is composed of a volume and file structure, a DVD-video zone and a DVD other zone, arranged from the inner radius to the outer radius of the DVD.

The DVD-video zone is arranged to record a video manager (VMG) followed by at least one video title set (VTS) according to a predetermined hierarchical structure.

The VMG is composed of video manager information (VMGI), a video object set (VMGM_VOBS), and a backup (VMGI_BUP) of the VMGI, and is written in advance with pertinent information or the like related to all the titles recorded in the volume space. For example, it can be used to write in advance playback data for a manipulation menu (called video manager menu) used commonly by all the VTSs, to present the manipulation menu to the user or the like when the DVD is played.

The VMGI of the VMG is provided to write playback control data or the like related to directories of all the VTSs recorded in the volume space, and the playback control data is defined to those described in the following paragraph as a typical example.

That is, the VMGI is arranged so that it is written with the playback control data as follows: a video manager information management table (VMGI_MAT) containing management information for managing the playback control data itself of the VMG; a title search pointer table (TT_SRPT) having search information for directly searching titles; a video title set attribute information table (VTS_ATRT) having attribute information of all the VTSs; a video manager menu PGC information unit table (VMGM_PGCI_UT) for playing back the video manager menu, etc.

Herein, the VMGM_PGCI_UT is written with program chain information (PGCI) for performing playback control of a program chain (PGC) forming the aforementioned video manager menu.

The VMGM_VOBS is composed of at least one video object (VOB), and each VOB is written with distributed playback data of the video manager menu. Further, each VOB is written with presentation control information (PCI) and data search information (DSI) for performing playback control of the distributed playback data of the video manager menu seamlessly.

According to the definition of the DVD standard, one or more VOBs forming the VMGM_VOBS and the aforementioned PGCI in the VMGI together form the PGC of the video manager menu. Hence, for example, the information playback apparatus sets the playback order of the respective VOBs based on the PGCI, and further, plays back the playback data in the respective VOBs seamlessly based on the PCI and the DSI in each, whereby it is possible to present the video manager menu to the user or the like.

Next, each VTS is a set of titles (for example, the contents, such as a movie and music), and is composed of: playback control data called video title set information (VTSI); a video object set (VTSM_VOBS) for a video title set menu for a manipulation menu (called video title set menu) used commonly by all the titles in the VTS; a video object set (VTSTT_VOBS) for video title set titles written with playback data of all the titles or the like; and a backup (VTSI_BUP) of the VTSI.

Like the aforementioned VMGI, the VTSI is written with playback control data related to the directories of the titles in the VTS.

It should be noted, however, that the VMGI is written with the playback control data related to the directories of all the VTSs whereas the VTSI is written with the playback control data related to the directories of the titles in the VTS, and therefore, the playback control data written in the VMGI and the playback control data written in the VTSI are of different natures.

Figure 9:
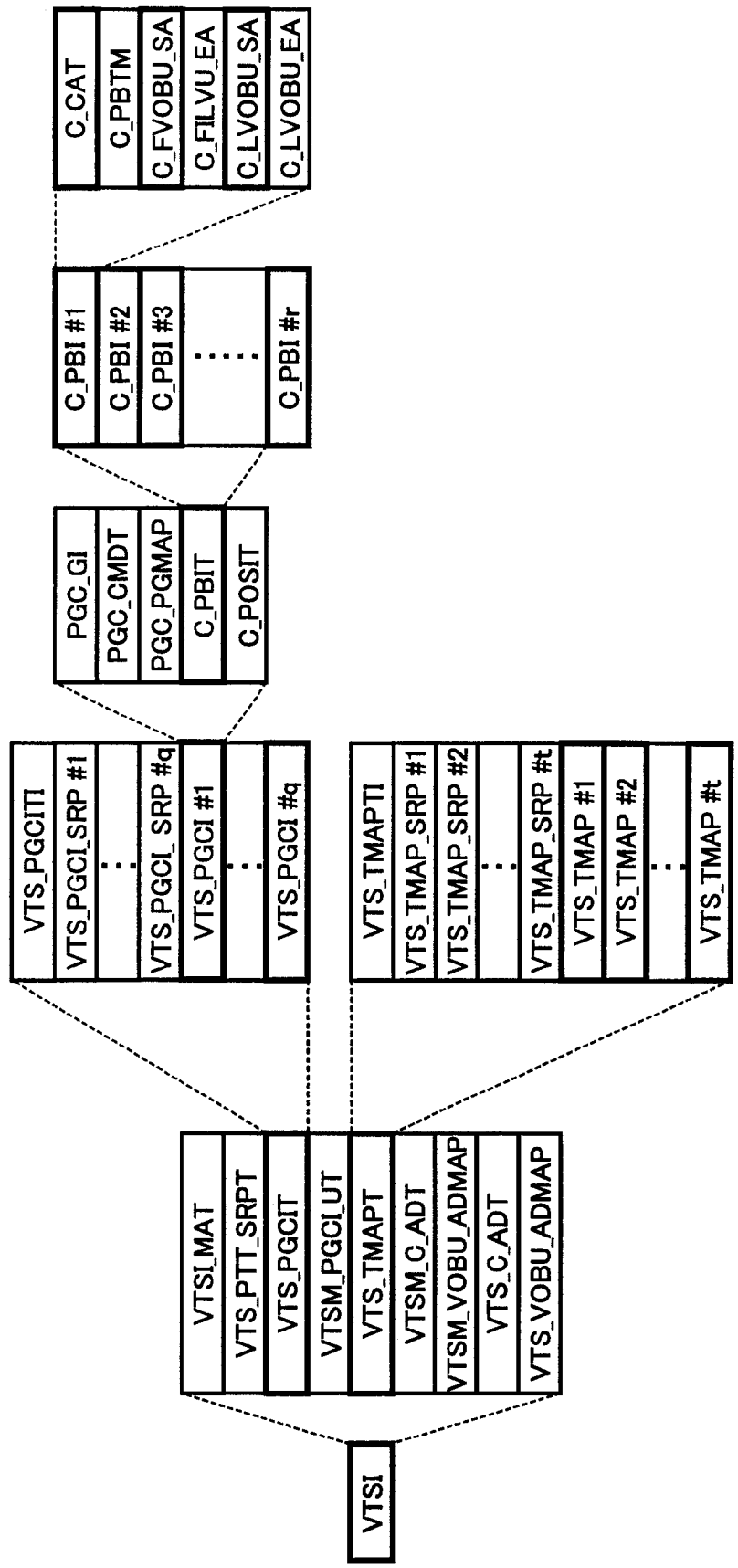
FIG. 9 is a view showing playback control data in video title set information (VTSI)

Although it will be described more in detail below, the playback control data in the VTSI is composed of, as shown in FIG. 9, playback control data of various kinds necessary in performing playback control of the playback data in all the titles, including a video title set information management table (VTSI_MAT) for managing the playback control data itself of the VTS.

The VTSM_VOBS is composed of at least one VOB for the VTS, and each VOB is written with distributed playback data of the video title set menu. Further, each VOB is written with the PCI and the DSI for seamlessly performing playback control of the distributed playback data of the video title set menu.

According to the definition of the DVD standard, one or more VOBs forming the VTSM_VOBS and the PGCI in the VTSI described below together form the PGC of the video title set menu. Hence, for example, the information playback apparatus sets the playback order of the respective VOBs for the VTS based on the PGCI, and further, plays back the playback data in the respective VOBs seamlessly based on the PCI and DSI in each, whereby it is possible to present the video title set menu to the user or the like.

To be more specific, contrary to the case of the aforementioned VMGM_VOBS in the VMG, where the PGC for the VMG is composed of (1) the VOBs forming the VMGM_VOBS in the VMG with each being written with the playback data for the video manager menu and the PCI and the DSI for playing back the playback data seamlessly and (2) the PGCI in the VMGI, in the case of the VTSM_VOBS in the VTS, the PGC for the VTS is composed of (1) the VOBs forming the VTSM_VOBS in the VTS with each being written with the playback data for the video title set menu in the VTS and the PCI and the DSI for playing back the playback data seamlessly and (2) the PGCI in the VTSI.

Figure 8:
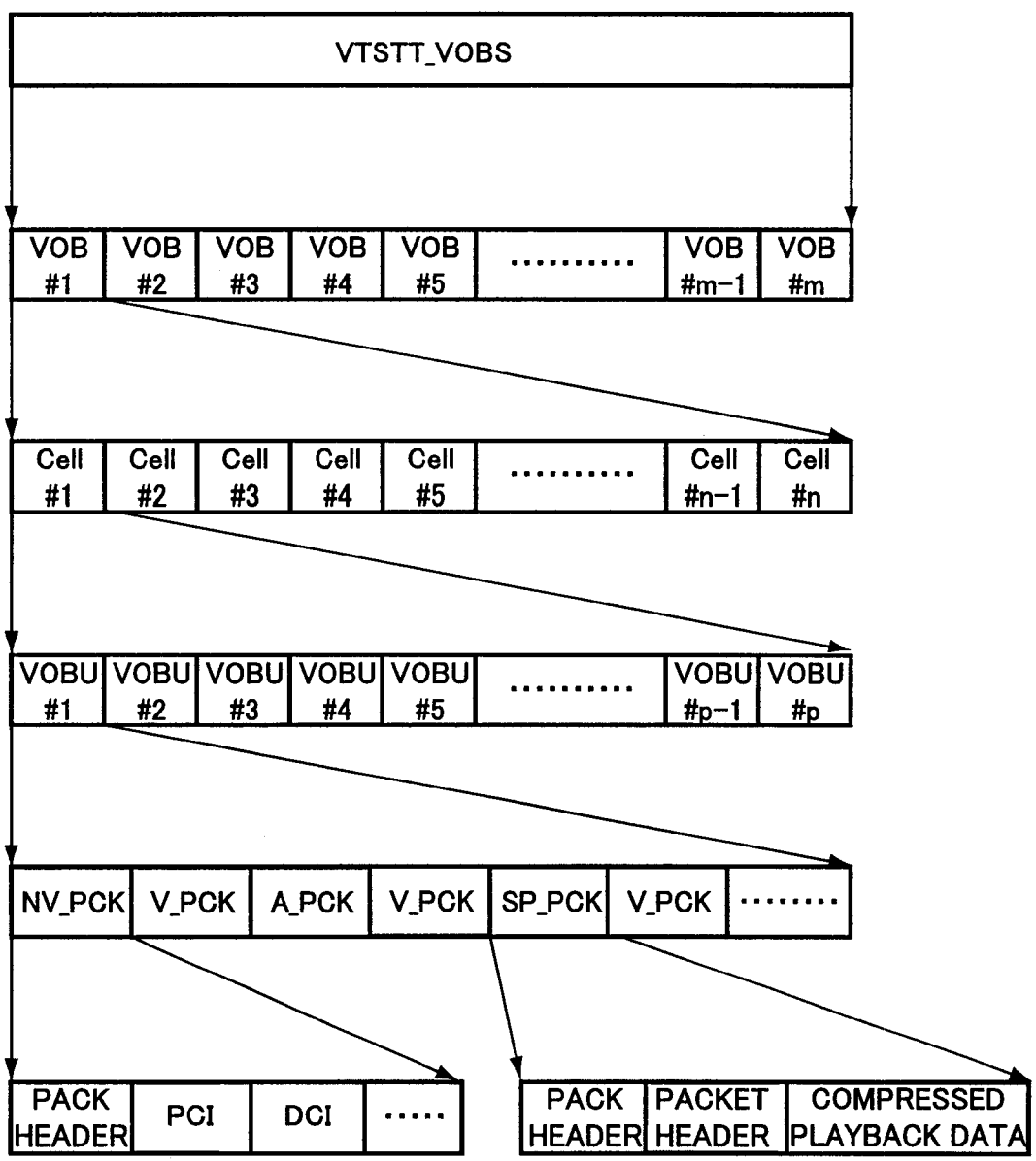
FIG. 8 is a view showing a data structure of a video object set (VTSTT_VOBS) for video title set titles.

Next, the following description will describe an arrangement of the VTSTT_VOBS with reference to FIG. 8.

The VTSTT_VOBS is composed of at least one VOB, and video data, audio data, or sub-picture data, which is the playback data of titles (for example, a movie or music), is divided into a predetermined data length and recorded in the respective VOBs in the VTSTT_VOBS. Also, the PCI and the DSI necessary for playing back the foregoing playback data seamlessly are divided and written therein too.

In other words, each VOB in the VTSTT_VOBS is composed of at least one cell (Cell), and each cell (Cell) is composed of a plurality of video object units (VOBUs), and the VOBUs are the smallest basic units forming the playback data.

Further, each VOBU is composed of a navigation pack (NV_PCK), and at least one of a video pack (V_PCK), an audio pack (A_PCK), and a sub-picture pack (SP_PCK).

Video data, audio data, and sub-picture data, all being the playback data, are divided into data of their respective predetermined lengths and recorded into the V_PCK, A_PCK, and SP_PCK, respectively. Further, each pack is composed of a pack header containing information identifying the aforementioned types (video data, audio data, or sub-picture data), a packet header, and video data, sub-picture data, or audio data having undergone data compression (compressed playback data).

The NV_PCK is written with the aforementioned PCI and the DSI. To be more specific, the NV_PCK is written with the PCI and the DSI for seamlessly playing back all the playback data in the V_PCK, A_PCK, and SP_PCK forming each VOBU.

Main playback control data of the PCI in the NV_PCK includes general information of the PCI (PCI_GI), non-seamless angle information (NSML_AGLI), highlight information (HLI), etc.

Herein, the PCI_GI contains address information, such as a playback start time (VOBU_S_PTM) and a playback end time (VOBU_E_PTM) of the respective VOBUs forming each cell (Cell). The NSML_AGLI is the information specifying a jump destination address (address of the VOBU) when switching the angles non-seamlessly, and the HLI contains information or the like for highlighting a part of a display area of a sub-picture displayed by the sub-picture data.

On the other hand, main playback control data of the DSI in the NV_PCK includes general information (DSI_GI), seamless playback information (SML_PBI), seamless angle information (SML_AGLI), VOBU search information (VOBU_SRI), synchronizing playback information (SYNCI), etc.

Herein, the DSI_GI contains address information of various kinds, such as an end address (VOBU_EA) of the VOBU currently being played back. The SML_PBI contains address information or the like necessary for seamless playback, such as a start time of the video pack and an end time of the audio pack in the VOBU currently being played back. The SML_AGLI contains information of a jump destination address when switching angles seamlessly. The VOBU_SRI contains the start address information of other VOBUs present at certain time intervals before and after the VOBU currently being played back. The SYNCI contains address information of the audio data and sub-picture pack to be played back in synchronization with the video data in the VOBU.

Next, the following description will describe the playback control data contained in the VTSI shown in FIG. 7 with reference to FIG. 9. In the following, an explanation will be given chiefly to the playback control data that the information playback apparatus uses when performing the scan playback.

As shown in FIG. 9, the VTSI is achieved by a hierarchal file structure, and files positioned at the highest directory include, besides the aforementioned VTSI_MAT, a video title set part-of-title search pointer table (VTS_PTT_SRPT), a video title set program chain information table (VTS_PGCIT), a video title set menu program chain information unit table (VTSM_PGCI_UT), a video title set time map table (VTS_TMAPT), a video title set cell address table (VTSM_C_ADT), a video title set menu video object unit address map (VTSM_VOBU_ADMAP), a video title set cell address table (VTS_C_ADT), and a video title set video object unit address map (VTS_VOBU_ADMAP).

Herein, the VTS_PGCIT is written with program chain information (PGCI) of PGCs forming the titles in the VTS.

To be more specific, as shown in the drawing, the VTS_PGCIT contains video title set PGCI table information (VTS_PGCITI), at least one video title set PGCI search pointer (VTS_PGCI_SRP), and at least one video title set PGCI (VTS_PGCI), and the VTS_PGCI is the PGCI of the respective PGCs forming the titles in the VTS.

Incidentally, the VTS_PGCITI is the management information of the VTS_PGCIT itself, and the files of the VTS_PGCI_SRPs and the VTS_PGCIs are written in the playback order of the PGCs forming the titles. Hence, assume that the titles are composed of q PGCs, and their playback order is: PCG#1, PGC#2, . . . , and PGC#q. Then, the VTS_PGCI_SRPs and the VTS_PGCIs are written according to the playback order of the PGCs as illustrated in the drawing by way of example: VTS_PGCI_SRP#1, VTS_PGCI_SRP#2, . . . , and VTS_PGCI_SRP#q, and VTS_PGCI#1, VTS_PGCI#2, . . . , and VTS_PGCI#q.

Thus, when the information playback apparatus plays back information, it searches the program chain information (VTS_PGCIs) written according to the order of the search pointers (VTS_PGCI_SRPs), whereby it can obtain the program chain information (VTS_PGCI) of a particular PGC to be played back.

Further, each VTS_PGCI contains playback control information necessary when controlling the playback of the PGC, and the playback control information includes program chain general information (PGC_GI), a program chain command table (PGC_CMDT), a program chain program map (PGC_PGMAP), a cell playback information table (C_PBIT), and a cell position information table (C_POSIT).

Herein, the PGC_GI is written with management information or the like of the PGC itself, the PGC_CMDT is written with command information for playback control, the PGC_PGMAP is written with a program for playback control, the C_PBIT is written with cell playback information which defines the playback order of the cells (Cells) in the PGC, and the C_POSIT is written with identification numbers of VOBs forming the PGC and identification numbers of the cells (Cells) forming the respective VOBs.

The C_PBIT is written with the cell playback information C_PBI#1, C_PBI#2, . . . , and C_PBI#r related to the respective cells (Cells) according to the playback order of the cells (Cells) in the respective VOBs.

Further, each cell playback information C_PBI contains C_FVOBU_SA, C_FILVU_EA, C_LVOBU_SA, and C_LVOBU_EA, which are the information related to the addresses of the VOBUs forming the cell in addition to a cell category (C_CAT), information of a cell playback time (C_PBTM) indicating a total playback time of the cell.

The cell category (C_CAT) is provided to define a cell (Cell) which has to be played back seamlessly after the preceding cell (Cell).

Assume that a given VOB is composed of a plurality of cells (Cell #1), (Cell #2), . . . , (Cell #x), (Cell #x+1), , (Cell #y), . . . , then the producer of the DVD is able to define that, for example, the cell (Cell #x+1) has to be played back seamlessly after the preceding cell (Cell #x).

Given with such a definition, when the information playback apparatus performs the scan playback, in case that the apparatus is to jump to the cell (Cell #x+1) after it played the cell (Cell #2) without playing back the succeeding cells up to the cell (Cell #x), for example, such a jump cannot be made, because an access to the cell (Cell #x+1) is inhibited.

In other words, the C_CAT is provided so as to inhibit scan playback such that makes a direct jump to the cell ((Cell #x+1) illustrated in the drawing by way of example) defined as an access-inhibited cell by the C_CAT after a given cell is played back before this particular cell. When the producer of the DVD or the like defines an access-inhibited cell (Cell) by the C_CAT in advance, a definition is given that the access-inhibited cell (Cell) has to be played back seamlessly after the preceding cell (Cell). This makes it possible to play back the access-inhibited cell (Cell) without fail (in other words, no skip reading is allowed).

The C_FVOBU_SA is the information specifying the start address of the first VOBU in the cell, the C_LVOBU_SA is the information specifying the start address of the last VOBU in the cell, and the C_LVOBU_EA is the information specifying the end address of the last VOBU in the cell. Further, the C_FILVU_EA is the address information specifying the end address of a first interleaved unit (ILVU) in the cell when there are ILVUs for performing playback seamlessly by interleaving two or more VOBs in the PGC.

As has been described above, the VTSI is written with the program chain information (VTS_PGCI) for the VTS for playing back the VOBs forming the PGC sequentially from cell (Cell) to cell (Cell), and further, the VTS_PGCI contains the address information (C_FVOBU_SA, C_FILVU_EA, C_LVOBU_SA, and C_LVOBU_EA) of each VOBU which is the playback data itself.

Figure 10:
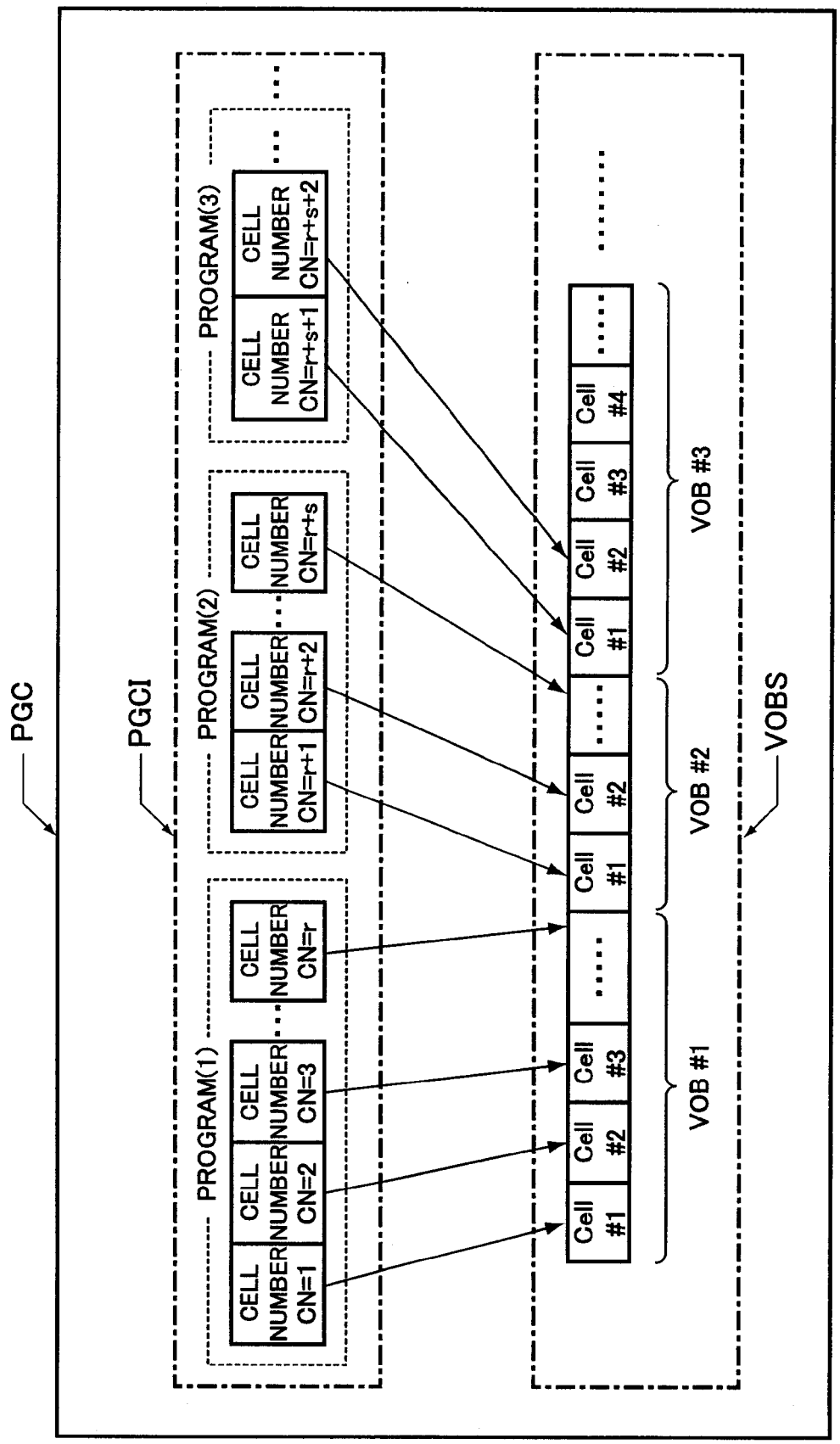
FIG. 10 is a view for explaining an arrangement and a playback principle of a program chain (PGC) composed of program chain information (PGCI) and a video object set (VOBS)
Figure 11:
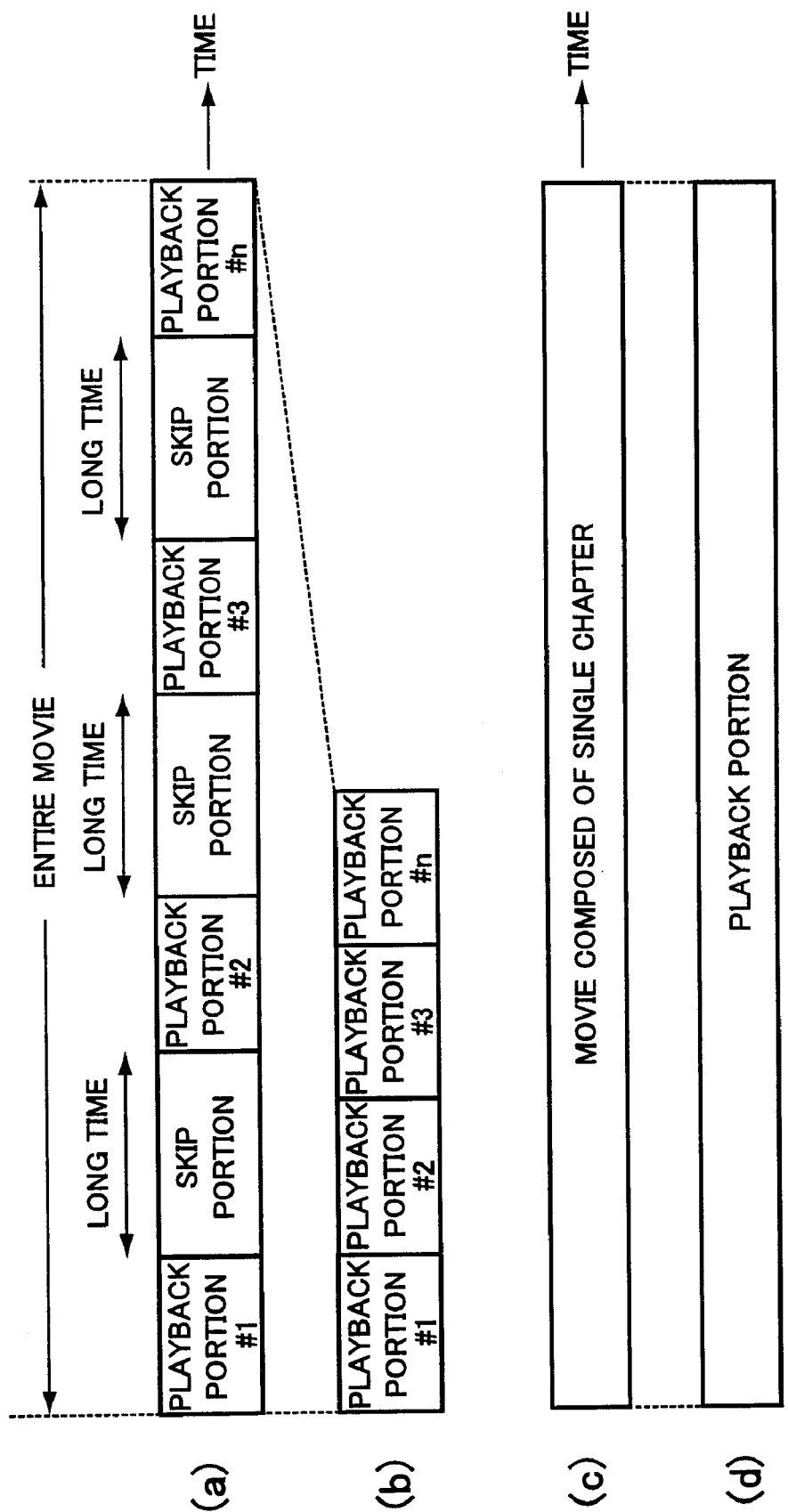
FIG. 11 is an explanatory view explaining problems caused by conventional scan playback.

Hence, when the information playback apparatus plays back the PGC of titles composed of the video object set (VOBS) including a plurality of VOBs and the PGCI as illustrated in FIG. 10 by way of example, the apparatus specifies the cells (Cells) to be played back in each VOB by the cell numbers (CNs) defined by the cell playback information C_PBIs in the PGCI and then specifies the order of the cells (Cells) to be played back according to the order of the cell numbers (CNs), whereby it is allowed to perform seamless playback.

To be more specific, assume that a program (1) corresponding to a given video object (VOB #1) contains C_PBI#1, C_PBI#2, . . . , and C_PBI#r, and the C_PBI#1, C_PBI#2, . . . , and C_PBI#r define the cell numbers CN=1, 2, . . . , and r, respectively. Then, the information playback apparatus selects and plays back the cells Cell #1, Cell #2, . . . , and Cell #r in the VOB #1 according to the order of the cell numbers CN=1, 2, . . . , and r. Subsequently, the apparatus plays back the NV_PCK, V_PCK, A_PCK, SP_PCK, etc. in the VOBUs in each of the cells (Cells) selected in the order of the cell numbers (CNs), while playing back the playback data in the V_PCK, A_PCK, and SP_PCK seamlessly based on the aforementioned PCI and DSI in the NV_PCK.

Referring to FIG. 9 again, the VTSM_PGCI_UT in the VTSI is written with PGCI necessary when seamlessly playing back the playback data of the aforementioned video title set menu (VTSM), that is, PGCI (VTSM_PGCI) for the video title set menu.

Also, the aforementioned VTS_TMAPT is a data table for writing address information (VTS_TMAPs) related to the recording positions of the VOBUs in each PGC of the VTS, and is written with video title set time map table information (VTS_TMAPTI), at least one video title set time map search pointer (VTS_TMAP_SRP), and at least one video title set time map (VTS_TMAP) described above to be searched correspondingly to the respective VTS_TMAP_SRPs.

It should be noted, however, that the VTS_TMAPs are not arranged to specify the recording positions of all the VOBUs in each PGC, and they are the address information specifying the recording positions of the VOBUs positioned at every certain playback time.

The VTS_TMAPTI is written with flag data indicating the arrangement of titles to distinguish titles composed of one sequential PGC from titles composed of multiple PGCs (Multi-PGC), for example.

The VTS_TMAP_SRPs are the search information for searching the respective VTS_TMAPs specifying the recording positions of the respective VOBUs, and written in the same writing order as the VTS_TMAPs. Hence, as is illustrated in the drawing by way of example, when a plurality of search pointers are aligned and written as VTS_TMAP_SRP#1, VTS_TMAP_SRP#2, . . . , and VTS_TMAP_SRP#t, then the address information of the recording positions is written in a corresponding manner as VTS_TMAP#1, VTS_TMAP#2, . . . , and VTS_TMAP#t. Hence, the information playback apparatus is able to know the recording positions (addresses) of the VOBUs at every certain playback time by referring to the respective VTS_TMAPs based on the VTS_TMAP_SPRs.

The above description described the summary of the playback control data when the information playback apparatus performs the scan playback described below, and an explanation of the playback control data of the other kinds is omitted herein.

Next, the following description will describe the arrangement of the information playback apparatus of the present embodiment with reference to FIG. 1.

The information playback apparatus is provided with a driving unit 2 for optically reading out information by achieving a random access to a DVD 1, and a signal processing unit 3 for controlling the driving unit 2 and generating a faithful playback signal by shaping the waveform of a readout signal from the driving unit 2.

In other words, the driving unit 2 is composed of a spindle motor for rotating the DVD 1 at a certain linear velocity, a pick-up allowed to move back and forth along a radius of the DVD 1, etc. The signal processing unit 3 controls the position of the pick-up with respect to a recording surface of the DVD 1 in reading out the information, and outputs a faithful playback signal by shaping the waveform of the readout signal.

Also, the signal processing unit 3 detects errors of various kinds, such as a tracking error and a focus error, from the playback signal, and applies the servo control to the driving unit 2 based on the detected error, thereby achieving highly accurate information reading.

Further, the signal processing unit 3 converts the playback signal into digital data by an unillustrated analog-to-digital converter, then applies signal demodulation and error correction in conformity with the DVD standard to the digital data, and supplies the resulting digital data to a system decoder 4. Herein, the signal processing unit 3 performs the aforementioned servo control and the signal processing in accordance with a control signal supplied from a system control unit 14 described below via a bus (BUS) 12.

The system decoder 4 analyzes the digital data supplied from the signal processing unit 3, and performs processing to playback the aforementioned playback data seamlessly. In other words, the system decoder 4 performs data analysis while temporarily buffering the digital data being supplied, then extracts playback control data (the aforementioned PGCI, PCI, DST, etc., in the VMGI and VTSI) related to playback control, and decodes the extracted data. Subsequently, the system decoder 4 plays back the playback data (all the data in the A_PCK, V_PCK, and SP_PCK, all the menus data in the VMGM_VOBS, VTSM_VOBS, etc.) in a stream based on the decoded playback control data. Then, a stream of played back data related to sounds, such as audio data in the A_PCK or the like, is supplied to a sound decoder 5, while a stream of played back data related to videos, such as the data in the aforementioned V_PCK and SP_PCK, is supplied to a video processing unit 8.

The system decoder 4 also operates in accordance with the control signal supplied from the system control unit 14 via the bus (BUS) 12, and further, it supplies the playback control data to the system control unit 14 via the bus (BUS) 12.

The sound decoder 5 decompresses audio data or the like in the A_PCK which is compressed by any adequate data compression method of various audio compression techniques including MPEG, MP3, ATRAC methods, etc. so as to be restored to original sound data, which is then supplied to a sound output circuit 6. The sound output circuit 6 converts the sound data thus supplied into an analog signal by a digital-to-analog converter (not shown), applies the processing of amplification or the like, and supplies the resulting analog signal to a speaker 7, whereupon a sound is played.

The video processing unit 8 decompresses a stream of played back data related to videos in the V_PCK, SP_PCK or the like which is decompressed by any adequate data compression method of various video compression techniques including MPEG method, etc. so as to be restored to original video data, which is then supplied to a video mixer 9.

The video mixer 9 is composed of a so-called digital adder which mixes the video data with OSD data upon supply of the OSD data from an OSD display control unit 16 described below, and outputs the resulting mixed video data to a video output circuit 10. The video mixer 9 outputs the video data intact to the video output circuit 10 when no OSD data is supplied.

The video output circuit 10 converts the video data and the mixed video data supplied from the video mixer 9 into an analog or digital video signal suitable for monitor display, and outputs the resulting output video signal to be supplied to a monitor 11, whereupon a video is played.

Herein, all of the sound decoder 5, sound output unit 6, video processing unit 8, video mixer 9, and video output circuit 10 operate under the control of the system control unit 14.

A manipulation unit 13 is provided with a display portion 13a composed of a liquid crystal display in addition to a keyboard the user or the like uses for a desired manipulation. Hence, the manipulation unit 13 supplies the system control unit 14 with a command that the user or the like has inputted with the keyboard, and displays various menus on the display portion 13a based on the video data supplied from the system control unit 14.

Herein, the manipulation unit 13 is connected to the bus 12, but it may be a remote control apparatus which can perform the foregoing operations by remote control. In other words, the various menus may be displayed on the display portion 13a by receiving video data supplied from the system control unit 14 in the form of infrared rays or the like.

The system control unit 14 is composed of a microprocessor (MPU) or the like furnished with computing and controlling functions, and includes an internal storage portion 14a composed of a semiconductor memory. Also, the system control unit 14 is responsible for playback control of the entire system, so that, as has been described above, it receives the playback control data extracted in the system decoder 4 and controls the system decoder 4 based on the reception playback control data. When the system control unit 14 performs playback control, the storage portion 14a performs processing for making the information playback apparatus display various menus by temporarily storing data including decompressed playback control data and address information supplied from the system decoder 4 and various kinds of computation data, or storing the OSD data generated by an OSD data generating unit 15 temporarily and supplying the same to the manipulation unit 13.

Next, the following description will describe an operation of the information playback apparatus arranged as above with reference to the flowchart of FIG. 2. Herein, an explanation will be given chiefly to an operation when the user or the like manipulates the manipulation unit 13 and specifies the scan playback.

Referring to FIG. 2, in Step S100, the user or the like inserts a desired DVD 1 into the information playback apparatus, then the system control unit 14 starts initialization in Steps S102 through s110.

In Step S102, playback data recorded in the VMG is read out first, and the aforementioned video manager menu is displayed on the screen of the monitor 11 while a simple video manager menu is also displayed on the display portion 13a of the manipulation unit 13.

Then, in Step S104, when the user or the like specifies the scan playback according to the display of the video manager menu, a "scan mode" is set as specified.

To be more specific, of all the selection items presented in the video manager menu, when the user or the like selects and specifies an item, "set conditions for scan playback," a sub-menu MENU as shown in FIG. 3(a) is displayed on the screens of the monitor 11 and the display portion 13a. When the user or the like inputs "a time scan time interval" and "a scan playback time" in response by using the keyboard of the manipulation unit 13, then, given "the time scan time interval" as a unit cycle B, a time A to perform playback within the unit time B is set by the scan playback time. In other words, a jumped time when playing back the playback data of titles in a stream is set for every unit cycle B. Also, at the same time, given A as a period to actually perform playback within the unit cycle B, then a period omitted from the playback subjects (hereinafter, referred to as the "jump period"), is set as B−A. For example, the user or the like specifies as: B=10 minutes and A=1 minute.

When the user or the like specifies to start the scan playback of the titles he/she wishes to be played back by scan playback, then the scan playback for the titles is started in Step S106. When the scan playback starts, as shown in FIG. 3(b), a video picture being played is displayed on almost the entire screen of the monitor 11, and the unit cycle B and a desired playback time A (hereinafter, referred to simply as the "playback time") are displayed at the corner of the screen (a portion which does not interfere with the picture being played) on a blue background display BB. Further, the unit cycle B and the playback time A are also displayed on the display portion 13a.

When the scan playback is started in this manner, then the specified titles are searched in Step S108. Herein, the titles are searched based on the information of the aforementioned title search pointer table (TT_SRPT).

Further, the VTSI of the searched titles is read out, and the start address of the titles contained in the VTSI is stored in the storage portion 14a as the data of the playback start time Tr of the titles. Further, in Step S110, the scan number n is set to "1" to set the initial unit cycle B, whereupon the initialization is completed.

After the initialization is completed in this manner, the flow proceeds to Step S112, and the process to playback the playback data contained in the VTS for the titles is started.

To be more specific, when the playback starts, the playback order of the cells (Cells) to be played back is specified based on the respective VTS_PGCIs contained in the VTS_PGCIT (see FIGS. 9 and 10), and the addresses of the VOBUs in each cell (Cell) are specified based on the C_FVOBU_SA, C_LVOBU_SA, etc. in the respective VTS_PGCIs. Then, all the playback data in the V_PCK, A_PCK, and SP_PCK is played back seamlessly in accordance with the PCI and the DSI contained in the NV_PCK in the respective VOBUs in each cell (Cell).

In Step S112 during which the playback data is being played back seamlessly, it is judged whether the current playback time (hereinafter, referred to simply as the current time) Tn has reached the end time of the playback time A within the unit cycle B. In other words, the address information specifying the positions of the respective VOBUs is obtained from the VTS_TMAPs contained in the VTS_TMAPT in the VTSI, the C_FVOBU_SA, C_LVOBU_SA, etc. in the respective VTS_PGCIs, and the NV_PCK, and the current time Tn is specified based on the address information thus obtained.

Then, the end time of the playback time A within the unit cycle B is found by computing $Tr+A+(n-1)\times B$, and whether the current time Tn has reached the end time thus computed or not is judged. Upon the judgment that the current time Tn has not reached the end time yet, the flow proceeds to Step S114, so that the seamless playback is continued and the process is repeated from Step S112.

Figure 4:
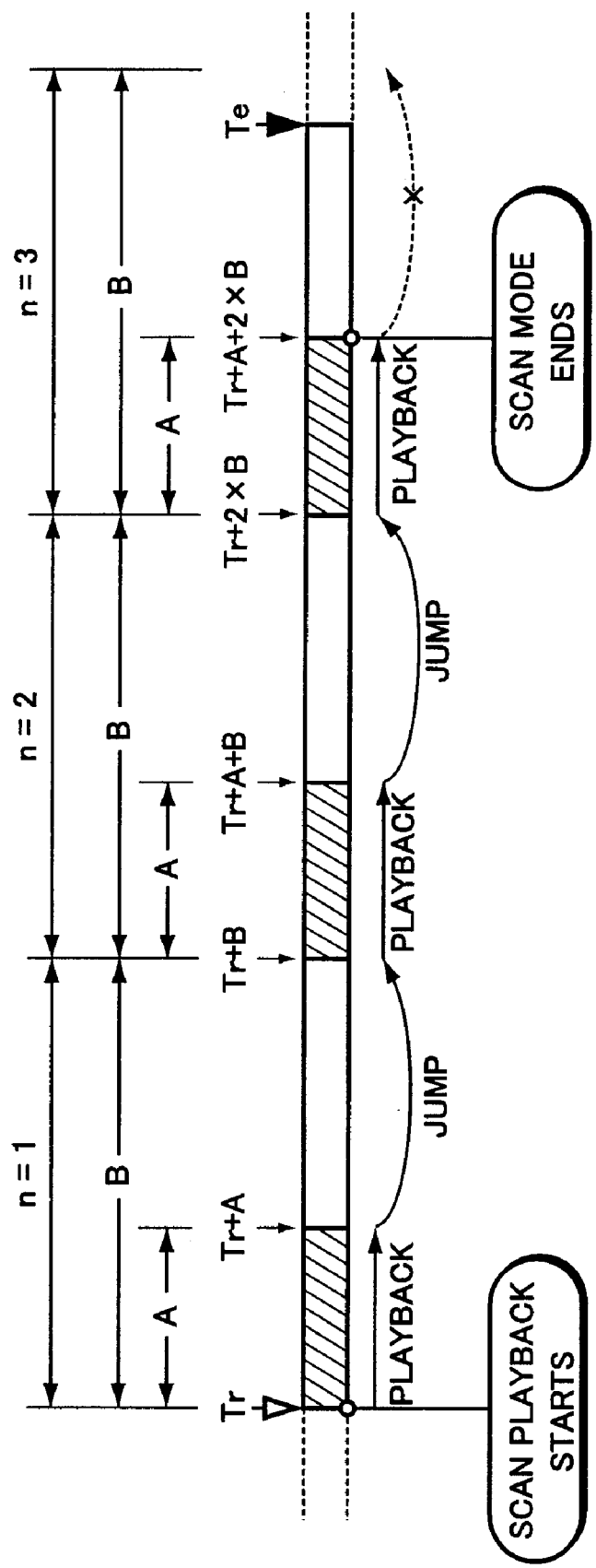
FIG. 4 is a view explaining an operation example in the case of scan playback of titles containing no access-inhibited cell.

By referring to FIG. 4, the following processing is performed when this judgment is made. That is, in the drawing, when the seamless playback is performed within the unit cycle B of the first time (scan number n=1), the end time of the playback time A within the unit cycle B is found as Tr+A from the computation of the above $Tr+A+(n-1)\times B$. Meanwhile, the current time Tn is specified based on the aforementioned address information. Given Tn<Tr+A, then it is judged that the current time Tn has not reached the end time Tr+A yet, and given Tn=Tr+A, it is judged that the current time Tn has reached the end time Tr+A.

When it is judged that the current time Tn has not reached the end time Tr+A yet, the flow proceeds to Step S114, so that the seamless playback is continued and the process is repeated from Step S112.

Thus, within the unit cycle B of the first time (scan number n=1), the seamless playback is started at the playback start time Tr of the titles and is continued within a period of the playback time A.

On the other hand, when it is judged that the current time Tn has reached the end time Tr+A in Step S112, the flow proceeds to Step S116. Herein, an address (time) of the jump destination is found by computing $Tr+n\times B$, and is then stored in the storage portion 14a.

In other words, when the user or the like specifies the unit cycle B and the playback time A, the specified time of the jump destination is computed on the condition that the playback data in the region of a jump period B−A will not be played back. For example, within the unit cycle B of the first time (scan number n=1) described above, the specified time of the jump destination is found as Tr+B. Then, the address of the jump destination is set by the specified time Tr+B of the jump destination.

In the first place, a cell corresponding to the specified time Tr+B is selected with reference to the cell playback time (C_PBTM). Then, the address of a VOBU corresponding to the specified time Tr+B is searched from the VTS_TMAPs, and whether the searched address is the address of any VOBU present within the selected cell is checked. In other words, the presence within the selected cell can be checked by referring to the start address (C_FVOBU_SA) of the first VOBU and the start address (C_LVOBU_SA) of the last VOBU in the cell. When the address is within the cell, the playback start time (VOBU_S_PTM) and the playback end time (VOBU_E_PTM) of the VOBU written in the PCI_GI in the NV_PCK are read out from the address of the VOBU, and whether the address thus searched is the address of an optimal VOBU (the address adequate as the jump destination of the Tr+B) is checked, after which the address is set as the address of the VOBU at the jump destination.

In case that the address of the VOBU searched from the VTS_TMAPs is not present within the selected cell, the NV_PCK is read out from the start address of the first VOBU or the start address of the last VOBU in the selected cell, which is then set as the address of the VOBU at the jump destination.

Subsequently, the flow proceeds to Step S118, and whether the specified time Tr+n×B of the jump destination exceeds a terminal end time Te of the titles (the playback time of the last cell of the titles) is checked. Herein, given Tr+n×B≦Te, then it is judged that the specified time of the jump destination is positioned within the playback time A and the flow proceeds to Step S120. On the other hand, given Tr+n×B>Te, then it is judged that the specified time of the jump destination has exceeded the playback time of the titles and that all the titles have been played back, whereupon the scan mode is terminated.

In Step S120, whether the specified time Tr+n×B of the jump destination corresponds to an access-inhibited area the producer of the DVD has set in advance is judged. In other words, it is judged whether the specified time Tr+n×B of the jump destination corresponds to the position of any VOBU within the access-inhibited cell (Cell) obtained by reading out the cell category C_CAT (see FIG. 9) during the aforementioned initialization. When the correspondence with the access-inhibited cell (Cell) is judged (in the case of YES), the flow proceeds to Step S122, and in the case of NO, the flow proceeds to Step S124.

In Step S122, a preset certain time α is added to the specified time Tr+n×B of the jump destination, and the specified time Tr+n×B as a new jump destination is replaced with the result of the addition, that is, the time Tr+n×B+α, after which the process from Step S118 is repeated. When the specified time Tr+n×B as the new jump destination no longer corresponds to the access-inhibited cell (Cell), the flow proceeds from Step S120 to Step S124.

The time α is set to a time substantially as long as a time required to play back data (data in the smallest basic unit) equivalent to one VOBU. In this case, the address of a VOBU following the address of the VOBU at the jump destination which corresponds to the aforementioned specified time Tr+n×B is set as the address of the jump destination.

Subsequently, in Step S124, the pick-up is moved to the address of the VOBU corresponding to the specified time Tr+n×B of the latest jump destination, and the playback is continued from this specified time. Further, in Step S126, the scan number n is incremented by one, and the process from the Step S112 is repeated.

When the scan playback as described above is performed, the operation is carried out in two different modes depending on whether the access-inhibited cell is contained in the titles or not.

Firstly, FIG. 4 shows a case when titles containing no access-inhibited cell are played back. When the user or the like specifies desired titles, and then specifies the scan time interval (unit cycle) B and the scan playback time (playback time) A, the start address (playback start position) Tr of the titles is obtained first, so that the scan playback at the scan number n=1 is performed. During the scan playback of the first time (scan number n=1), after the seamless playback which begins from the playback start position Tr and ends at the end time Tr+A of the playback time A is performed, a jump is made from the end time Tr+A to the specified position Tr+B at the next scan number n=2. Then, at the scan number n=2, the seamless playback which begins from the specified position Tr+B and ends at the end time Tr+A+B of the playback time A is performed, and a jump is made from the end time Tr+A+B to the specified position Tr+2×B at the next scan number n=3. Accordingly, the scan playback is performed as the user or the like has specified, by repeating the seamless playback within the playback time A and a jump at each scan number n in this manner, and the scan playback ends when the specified time Tr+n×B of the jump destination exceeds the terminal time Te of the titles.

As has been described, according to the present embodiment, it is possible to realize scan playback under the conditions the user or the like desires. In particular, since the scan playback is performed by managing the scan time interval (unit cycle) B and the scan playback time (playback time) A based on the address information of the VOBU, which is the smallest unit of the playback data, it is possible to provide more flexible scan playback with extremely high accuracy in comparison with the chapter-by-chapter or track-by-track scan playback, thereby making it possible to enhance the convenience of the user or the like.

Figure 5:
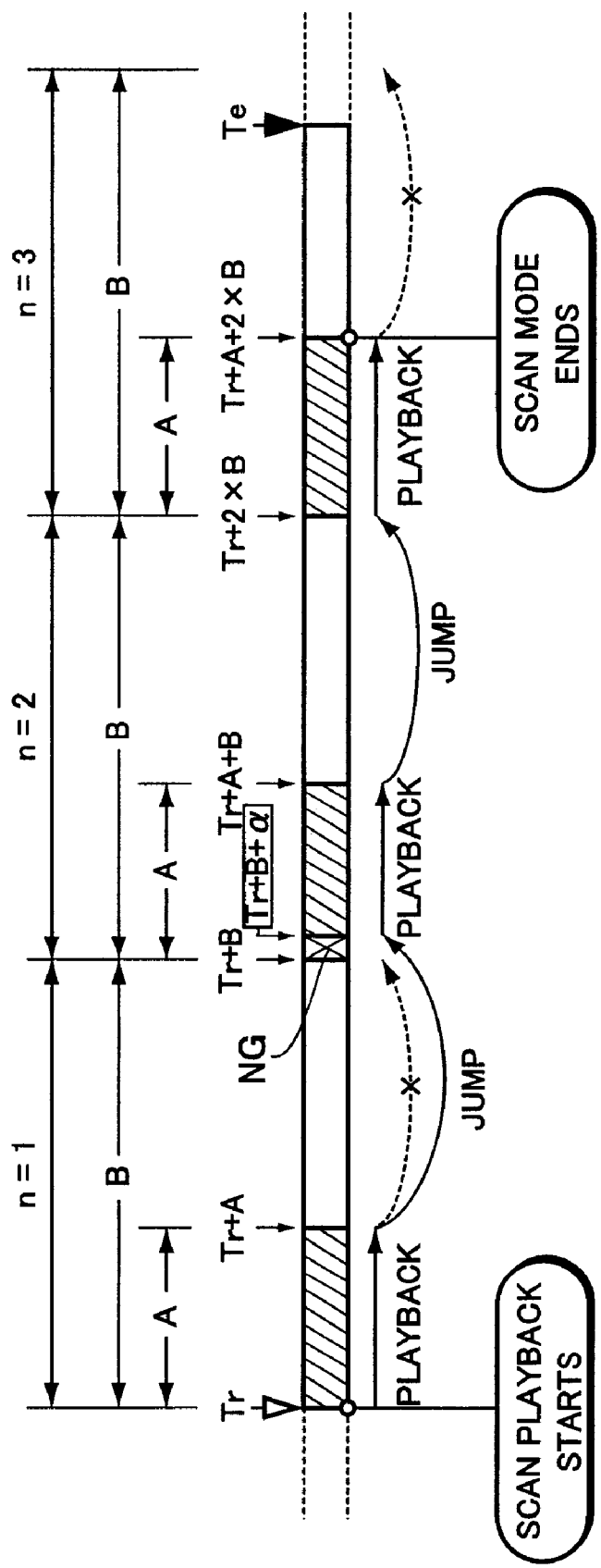
FIG. 5 is a view explaining an operation example in the case of scan playback of titles containing an access-inhibited cell.

Secondly, FIG. 5 shows a case when titles containing the access-inhibited cell are played back. Herein, assume that an access-inhibited cell NG is contained at the scan number n=2, for example. When the user or the like specifies the desired titles, and then specifies the scan time interval (unit cycle) B and the scan playback time (playback time) A, the seamless playback which begins from the start address (playback start position) Tr of the titles and ends at the end time Tr+A of the playback time A at the scan number n=1 is performed, after which the specified position Tr+B at the next scan number n=2 is computed from the end time Tr+A. Since the cell NG corresponding to the specified position Tr+B is defined as the access-inhibited cell in the cell category C_CAT, a jump is not made directly from the end time Tr+A to the specified position Tr+B. Instead, a specified position Tr+B+α is obtained as a new specified time by adding the certain time α, and when the new specified time does not correspond to the position of the access-inhibited cell, a jump is made by determining the new specified time as a true specified time at the scan number n=2. Then, the seamless playback is continued from the jump destination, and thereafter, the same process as described with reference to FIG. 4 is repeated.

As has been described, according to the present embodiment, the scan playback is performed for the titles containing the access-inhibited cell without making a jump directly to the access-inhibited cell. Hence, it is possible to realize scan playback in conformity with the DVD standard.

Further, even when the scan playback is performed for the titles containing the access-inhibited cell, because the scan playback is performed by managing the scan time interval (unit cycle) B and the scan playback time (playback time) A based on the address information of the VOBU, which is the smallest unit of the playback data, it is still possible to provide more flexible scan playback with extremely high accuracy in comparison with the chapter-by-chapter or track-by-track scan playback, thereby making it possible to enhance the convenience of the user or the like.

Moreover, when the specified time corresponds to the access-inhibited cell, a new specified time is found by adding a short time a for playing back the data within one VOBU. Hence, even when the set position of the unit cycle B or the playback time A varies because of the presence of the access-inhibited cell, a quantity of such variation can be extremely small. Consequently, it is possible to realize the scan playback extremely faithful to the conditions of the unit cycle B and the playback time A the user or the like has specified.

Figure 6:
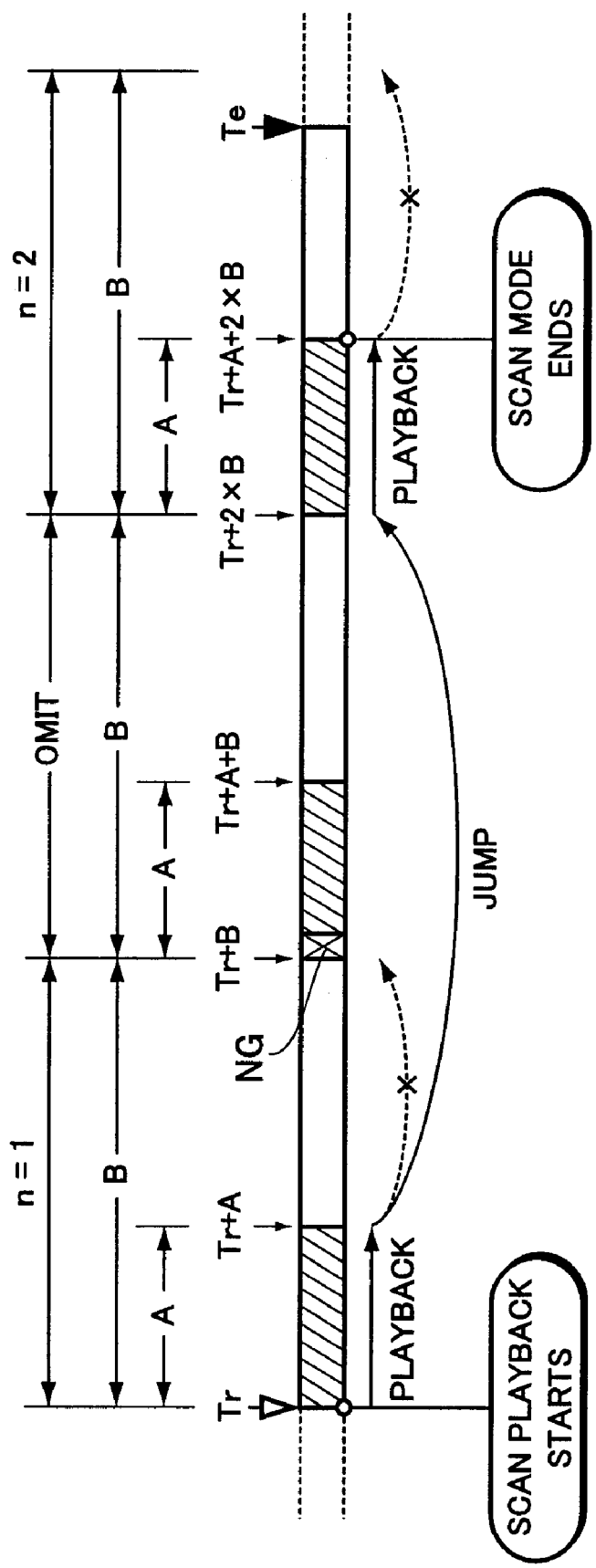
FIG. 6 is a view explaining an operation example in the case of scan playback using a modified information playback apparatus of the present embodiment.

In the present embodiment described above, a relatively short time is given to the time α. However, it may be arranged in such a manner that, when the access-inhibited cell is present at the position of the specified time of the jump destination, the entire region of the unit cycle B containing the access-inhibited cell is jumped, so that the seamless playback is performed from the next unit cycle B. To be more specific, as shown in FIG. 6, when the access-inhibited cell is present at the jump destination within the unit cycle B which will be the scan number n=2 after the seamless playback within the playback time A at the scan number n=1 is completed, the entire unit cycle B which will be the scan number n=2 is omitted from the subjects of the seamless playback, and the unit cycle B following the omitted unit cycle B is set as the one at the scan number n=2, so that a jump is made and the scan playback is continued therefrom.

According to such a modification, there may be a case that the unit cycle B omitted from the subjects of the seamless playback may be long depending on the conditions of the scan playback the user or the like has set. However, it is possible to avoid a problem that the convenience of the user or the like is reduced significantly in a practical use.

An explanation was given to the information playback apparatus of so-called hardware configurations. However, the present invention is not limited to the foregoing, and may be achieved by a computer program. To be more specific, the functions of the system decoder 4, voice decoder 5, video processing unit 8, video mixer 9, system control unit 14, OSD data generating unit 15, and OSD display control unit 16 of FIG. 1 may be achieved by a computer program. Hence, for example, a personal computer equipped with a DVD driver device for reading out information optically from the DVD may perform the same scan playback function as that of the information playback apparatus described in the embodiment above by running the computer program with a microprocessor (MPU) installed therein.

Alternatively, the computer program may be recorded into an information recording medium, such as a DVD, and provided to the user or the like. In other words, the computer program may be recorded into a DVD having recorded titles to be played back, and the DVD is inserted into electronic equipment, such as a personal computer, provided with a microprocessor (MPU), so that the electronic equipment, such as a personal computer, may perform the same scan playback function as that of the information playback apparatus described in the embodiment above by making the microprocessor (MPU) install the computer program from the DVD and run the computer program.

Further, the computer program may be recorded into an information recording medium different from a DVD having recorded titles to be played back, so that the computer program is installed into the electronic equipment, such as a personal computer, via the information recording medium and run on the electronic equipment.

As has been described, according to the information playback apparatus of the present invention, the scan playback is performed for the playback data by managing the playback time for every unit cycle based on the playback control data having the address information and the information of the playback order of the data in the smallest basic units of the playback data. Hence, in comparison with the scan playback on a chapter-by-chapter or track-by-track basis, not only can accurate scan playback be realized, but also non-playback portions and playback portions of so-called titles can be set accurately and freely.

Also, when the access-inhibited data is present within the playback data, the scan playback is performed by omitting the access-inhibited data. Consequently, it is possible to provide scan playback which does not go against (in conformity with) the standard of the information recording media.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information playback apparatus for playing back data recorded in an information recording medium, comprising:

a playback unit for playing back control data which includes address information and playback order, said data configured to be in the smallest basic units and recorded in said information recording medium, and for playing back said data according to said control data; and a control unit for, upon being specified by a playback time for every unit cycle, setting said playback time for every unit cycle as desired playback times to perform playback of said data, managing said desired playback times according to said address information, and for controlling said playback unit to play back, of all said data in the smallest basic units, only the data-corresponding to said desired playback times.

2. The information playback apparatus according to claim 1, wherein, after the data in the smallest basic units corresponding to one of said desired playback times is played back, and when access-inhibited data is present at a start position of a next desired playback time, said control unit controls said playback unit to continue to perform playback except said access-inhibited data.

3. The information playback apparatus according to claim 2, wherein, when said access-inhibited data is present at the start position of said next desired playback time, said control unit controls said playback unit to omit said next desired playback time and then to continue to perform playback from a further next desired playback time.

* * * * *